(12) United States Patent
Hecht et al.

(10) Patent No.: US 12,443,746 B1
(45) Date of Patent: Oct. 14, 2025

(54) SYSTEMS AND METHODS FOR SECURE SHARING OF INFORMATION IMPORTED INTO ACCOUNT

(71) Applicant: Wells Fargo Bank, N.A., San Francisco, CA (US)

(72) Inventors: Alan W. Hecht, Chanhassen, MN (US); Javier S. Silva, Concord, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 309 days.

(21) Appl. No.: 17/953,059

(22) Filed: Sep. 26, 2022

Related U.S. Application Data

(63) Continuation of application No. 16/900,090, filed on Jun. 12, 2020, now Pat. No. 11,455,421, which is a continuation of application No. 15/042,108, filed on Feb. 11, 2016, now Pat. No. 10,685,136.

(60) Provisional application No. 62/115,391, filed on Feb. 12, 2015.

(51) Int. Cl.
*G06F 21/62* (2013.01)

(52) U.S. Cl.
CPC ................ *G06F 21/6245* (2013.01)

(58) Field of Classification Search
CPC .. G06F 21/6245; H04L 67/306; H04L 63/102
See application file for complete search history.

(56) References Cited

U.S. PATENT DOCUMENTS

| | | | |
|---|---|---|---|
| 6,341,291 B1 | 1/2002 | Bentley et al. | |
| 2002/0108057 A1* | 8/2002 | Zhanhong Wu | H04L 63/08 726/6 |
| 2006/0026042 A1 | 2/2006 | Awaraji et al. | |
| 2007/0179995 A1 | 8/2007 | Prahlad et al. | |
| 2008/0249937 A1* | 10/2008 | Walls | G06Q 20/24 705/42 |
| 2009/0132543 A1 | 5/2009 | Chatley et al. | |
| 2009/0138481 A1 | 5/2009 | Chatley et al. | |
| 2009/0300747 A1 | 12/2009 | Ahn | |
| 2010/0185871 A1* | 7/2010 | Scherrer | G06F 21/6218 726/4 |
| 2011/0270761 A1 | 11/2011 | Graham et al. | |
| 2014/0181935 A1 | 6/2014 | Beckmann et al. | |
| 2015/0379469 A1* | 12/2015 | Gordon | G06F 16/951 705/342 |
| 2016/0070717 A1 | 3/2016 | Bergner et al. | |
| 2016/0132696 A1 | 5/2016 | Vidhani et al. | |
| 2017/0200122 A1 | 7/2017 | Edson et al. | |
| 2018/0060868 A1* | 3/2018 | Mattes | G06Q 30/0185 |

* cited by examiner

*Primary Examiner* — Theodore C Parsons
(74) *Attorney, Agent, or Firm* — Foley & Lardner LLP

(57) ABSTRACT

A system for user registration and preference configuration. The system comprises at least one processing circuit to receive an enrollment request of a user, import user content of the user based on the availability of the user content, create a user account for the user, wherein the user account comprises the user content, import, via a listener channel, content from a user device associated with the user, wherein the importing includes extracting data from the content, receive a content share request from a third-party for a piece of content, and authorize the third-party based on cross-referencing the content share request with a plurality of sharing rules set by the user, wherein the authorization comprises a limitation on the piece of content.

20 Claims, 8 Drawing Sheets

SYSTEMS AND METHODS FOR SECURE SHARING OF INFORMATION IMPORTED INTO ACCOUNT

CROSS-REFERENCE TO RELATED APPLICATIONS

This application is a continuation of U.S. patent application Ser. No. 16/900,090, filed Jun. 12, 2020, now U.S. Pat. No. 11,455,421, which is a continuation of U.S. patent application Ser. No. 15/042,108, filed Feb. 11, 2016, now U.S. Pat. No. 10,685,136, which claims priority to U.S. Provisional Application No. 62/115,391, filed Feb. 12, 2015, each of which are incorporated herein by reference in their entireties.

TECHNICAL FIELD

Embodiments of the present invention relate generally to information storage and sharing systems and methods.

BACKGROUND

Individuals are often asked to provide personal documents and information in connection with receiving various goods or services, entering various transactions, or generally providing the information to another entity (e.g., the government). The personal information may include government issued identification documents (e.g., drivers' licenses, social security numbers, birth certificates, passports, state identifications, etc.), other government documents (e.g., tax forms, property deeds, etc.), employment forms (e.g., resumes, tax forms, pay stubs, school transcripts, etc.), biometric data (e.g., fingerprints, voice samples, retina scans, facial image data, etc.), passwords, personal identification numbers ("PINs"), other personal information (e.g., mother's maiden name, date of birth, height, weight, answers to security questions, etc.), or a combination thereof. Often times, individuals are asked to provide verified information and documents their identities with a second party involved in the transaction, be it another individual, a group of individuals, a commercial entity, or a government entity.

Providing this information and documents may become cumbersome and/or overly burdensome depending on the amount of documents needed and whether the documents need to be verified as authentic. For example, in certain transactions, an individual may be required to present a driver's license, a birth certificate, and a social security card. This requires that the individual locate (or order) each document, which may require multiple trips to document storage and production facilities (e.g., a first trip to a government office to order a birth certificate, a second trip to a bank safe deposit box to retrieve a social security card, etc.). These issues may be further magnified in situations where the person or entity is entering into a series of repeated transactions or a multiparty transaction, wherein each transaction requires a different combination of documents and information.

SUMMARY

One example embodiment relates to an information computing system. The system includes a network interface structured to facilitate the sending and receiving of data to and from a user device, a third-party device, and a financial institution computing system. The system further includes an account management circuit structured to manage a plurality of user accounts associated with a plurality of users of the information computing system. The system includes an inbound information circuit structured to receive and process user content associated with the plurality of users, wherein the user content is received from the user device, the third-party device, and the financial institution computing system. The system further includes a user information database storing the user content associated with the plurality of users.

Another example embodiment relates to a method. The method includes receiving, by an account management circuit of an information computing system, an enrollment request from a user device associated with a user, wherein the enrollment request includes an identification of an account associated with the user held with a financial institution. The method further includes importing, by the account management circuit from an account holder database of a financial institution computing system associated with the financial institution, known user content during an initial content import phase. The method includes creating, by the account management circuit, a user account for the user. The method further includes storing, by an inbound information circuit of the information computing system, at least a portion of the known user content in a user information database.

A further example embodiment relates to a method. The method includes receiving, by an account management circuit of an information computing system, a request to create a secure sharing zone from a registered user of the information computing system, wherein the registered user maintains user content with the information computing system. The method further includes creating, by the account management circuit, the secure sharing zone, wherein the registered user and an unregistered user can provide content to the secure sharing zone. The method includes receiving, by the account management circuit, first content from a first user device associated with the unregistered user. The method further includes receiving, by the account management circuit, a request to export second content stored in the user content associated with the registered user from a second user device associated with the registered user. The method includes storing, by the account management circuit, the first content and the second content in the secure sharing zone.

These and other features of the implementations described herein, together with the organization and manner of operation thereof, will become apparent from the following detailed description when taken in conjunction with the accompanying drawings, wherein like elements have like numerals throughout the several drawings described below.

DETAILED DESCRIPTION

Referring to the Figures generally, systems and methods for providing for a personal data storage, retrieval, and sharing system. The system permits users, such as individuals, to store important personal documents and personal information in a secure data storage system. The personal documents may government issued documents (e.g., drivers' licenses, social security numbers, birth certificates, passports, state identifications, etc.), other legal documents (e.g., tax forms, property deeds, estate documents, etc.), employment information and forms (e.g., resumes, tax forms, pay stubs, school transcripts, etc.), and the like. The documents may be imported into the system by the user or by another party on the user's behalf (e.g., a third-party, a financial institution, etc.). The documents may be stored as image files. The system can extract information from the stored documents. For example, if a user stores his driver's license in the system, the system may extract the user's name, the user's address, the user's date of birth, and the like by performing optical character recognition on an image of the driver's license. The user can then share stored documents themselves or the information extracted from the stored documents with other users. The other users may include individuals and entities (e.g., a bank, a government agency, a retailer, etc.). The system may prefill forms and other documents based on the information extracted from the stored personal documents. The system may be integrated with an information wallet system configured to receive information from a user and enable the user to communicate the information in a highly secure, convenient, efficient, time-saving, and cost-effective manner.

Figure 1:
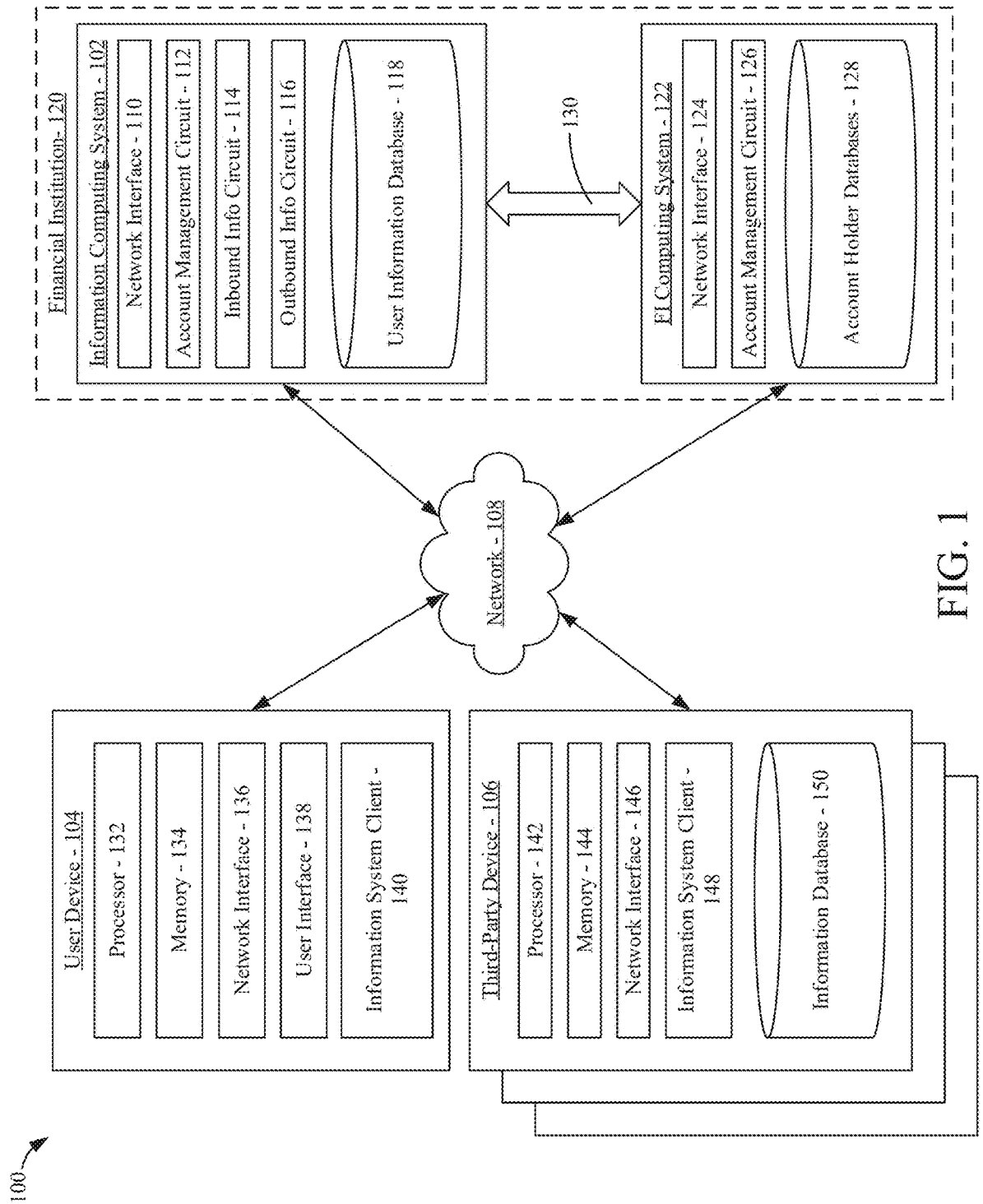
FIG. 1 is a diagram of a system is shown according to an example embodiment.

Referring to FIG. 1, a diagram of a system 100 is shown according to an example embodiment. The system 100 facilitates the secure storage and sharing of documents and information relating to a plurality of users. The system includes an information computing system 102, a user device 104 associated with a user of the system 100, and a plurality of third-party devices 106 each associated with a different third-party (e.g., a merchant, a government agency, an employer, another user, etc.). Although only a single user device 104 is shown, the system 100 is designed to work with a plurality of user devices associated with a plurality of users. Each of the information computing system 102, the user device 104, and the third-party devices 106 communicate data with other systems and devices via a network 108.

The information computing system 102 is structured to provide the personal data storage, retrieval, and sharing system described herein. The information computing system 102 includes a network interface 110, an account management circuit 112, an inbound information circuit 114, an outbound information circuit 116, and a user information database 118. The network interface 110 is structured to facilitate the sending and receiving of data to and from other computing devices (e.g., the user device 104, the third-party devices 106) via the network 108. For example, via the network interface 110, the information computing system 102 can receive and transmit documents associated with users. The account management circuit 112 is structured to manage user accounts (e.g., register users, deactivate user accounts, associate user preferences with accounts, etc.) with the information computing system 102. The inbound information circuit 114 is structured to receive and process user information and documents (i.e., user content) for storage in the user information database 118. The outbound information circuit 114 is structured to process information requests and to send user information and documents from the user information database 118 to other devices (e.g., to a third-party device 106, to the user device 104, etc.). The user information database 118 is structured to store user information and documents (i.e., user content). A detailed explanation of the functionality of the information computing system 102 and its components is set for the below with respect to FIGS. 2 through 8.

In some arrangements, the information computing system 102 is associated with a financial institution 120 (sometimes shortened to "FI" in the figures), such as a bank. In such arrangements, the financial institution 120 includes both the information computing system 102 and a financial institution computing system 122. The financial institution computing system 122 is structured to provide financial services to account holders and to maintain information (e.g., account numbers, social security numbers, account balances, financial documents, etc.) associated with account holders. As such, the financial institution computing system 122 includes a network interface 124, an account management circuit 126, and an account holder database 128. The network interface 124 allows the financial institution computing system 122 to send and receive data to and from other computing devices (e.g., account holder devices, the user device 104, the third-party devices 106) via the network 108. The financial institution computing system 122 includes an account management circuit 126. The account management circuit 126 is structured to manage the various accounts held with the financial institution and the information stored in the account database 128. The account holder database 128 stores information associated with accounts held with the financial institution, such as account numbers, account balance information, account ownership information, online banking credentials, and the like. Additionally, the account holder database 128 stores information used by account holders to register with the financial institution, such as social security card scans, driver's license scans, tax information, personal information, and the like. In some arrangements, the financial institution 120 maintains multiple account holder databases 128 (e.g., one for each type of financial product offered by the financial institution 120). The financial institution computing system 122 and the information computing system 102 may communicate directly via an internal financial institution network 130 (e.g., a private intranet network not accessible by the user device 104 and the third-party device 106).

The user device 104 is associated with a user of the information system provided by the information computing system 102. The user device 104 is a personal computing device, such as a smartphone, a table computing system, laptop, personal digital assistant, or the like. As such, the user device 102 includes a processor 132, memory 134, a network interface 136, and a user interface 138. The processor 132 executes program instructions stored in the memory 134 that cause the processor 132 to control the operation of the user device 104. The network interface 136 allows the user device 104 to send and receive data to and from other computing devices (e.g., the information computing system 102, the third-party devices 106) via the network 108. The user interface 138 includes a user input (e.g., a keyboard, a mouse, etc.) and a user output (e.g., a display). In some arrangements, the user interface 138 includes both a user input and a user output (e.g., a touch-screen display).

The user device includes an information system client 140. The information system client 140 allows the user (via the user device 104) to interact with the information computing system 120. For example, through the information system client 140, the user can create an account with the information computing system, upload documents, retrieve documents, import documents from a third-party, share documents with a third-party, and the like. In some arrangements, the information system client 140 is a standalone application executed by the processor 132. In other arrangements, the information system client 140 is a website or web-based application hosted by the information computing system 102 that is accessed via a web browser of the user device 104.

Still referring to FIG. 1, each of the third-party devices 106 is associated with a given entity (e.g., a government entity, a merchant, an employer, a financial institution, etc.). In some arrangements, the entity may provide information and documents to the information computing system (e.g., an employer may provide paystubs). In other arrangements, the entity may request and/or receive user information from the information computing system 102. The third-party device 106 is a computing system. Accordingly, the third-party device 106 includes a processor 142, memory 144, and a network interface 148. The processor 142 executes program instructions stored in the memory 144 that cause the processor 142 to control the operation of the third-party device 106. The network interface 146 allows the third-party device 106 to send and receive data to and from other computing devices (e.g., the information computing system 102, the user device 104) via the network 108. The third-party device 106 includes an information system client 148. The information system client 148 is similar to the information system client 140 of the user device. Accordingly, the information system client 140 allows the third-party device 106 to send user information and documents to the information computing system 102, request user information and documents from the information computing system 102, and receive user information and documents from the information computing system 102. In some arrangements, the information system client 148 facilitates communication between the third-party device 106 and the user device 104 (e.g., messages, authorization requests, etc.). In some arrangements, the third-party device 106 maintains an information database including information and/or documents relating to users.

The operation of the system 100, and in particular the information computing system 102, is described in greater detail below with respect to FIGS. 2 through 7.

Figure 2:
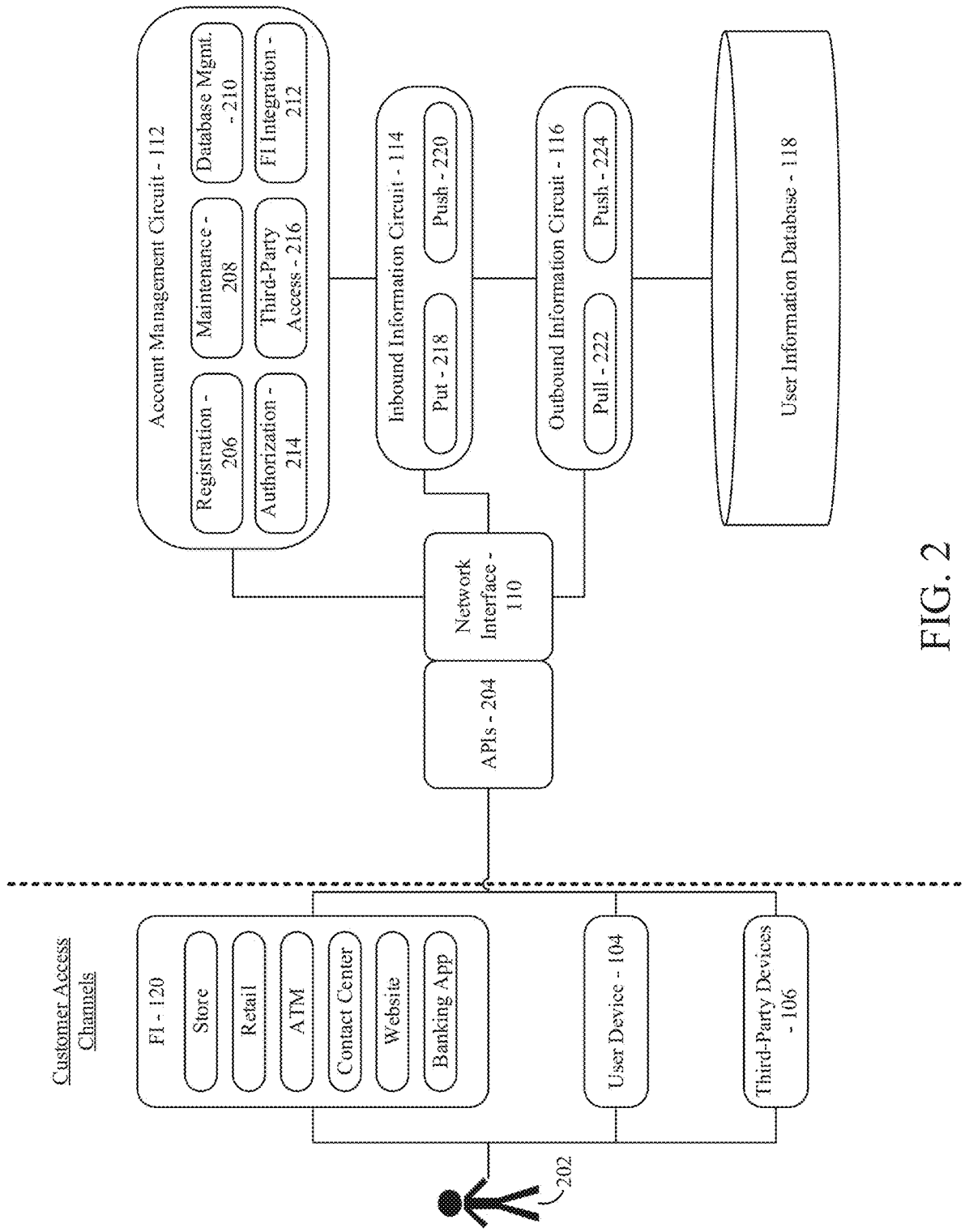
FIG. 2 is a diagram demonstrating the various ways that a user can interact with the information computing system of FIG. 1.

Referring to FIG. 2, a diagram demonstrating the various ways that a user 202 (i.e., a user having an account with the information computing system) can interact with the information computing system 102. The user 202 can provide and pull documents and information to and from the information computing system 102 via the user device 104 and the third-party devices 106. For example, the user can upload a document via their user device 104 for storage in the user information database 118, which can later be pulled with the permission of the user by a third-party via the third-party device 106. Similarly, a third-party (e.g., the user's employer) can transmit a document (e.g., a paystub) to the user information database 118, and the user 202 can later pull the document via the user device 104. In arrangements where the information computing system 102 is part of the financial institution 120, the user 202 can also interact with the information computing system 102 via the various banking channels accessible by the user 202 (e.g., via a financial institution store or retail location by interacting with an employee of the financial institution 120, via an ATM, via a financial institution contact center, via a financial institution website, via a financial institution mobile banking application, etc.).

Data in and out of the information computing system 102 may pass through the network interface 110. To facilitate the large number of ways that the user 202 can interact with the information computing system 102, the information computing system 102 may offer a number of APIs 204 (application program interfaces) such that third-party systems and applications can integration information computing system 102 functionality. The APIs 204 may include, for example, an administration functions API, a sharing functions API, a registration functions API, a data and content maintenance functions API, and the like. The APIs 204 provide access to the various functions of the information computing system 102 described below.

The account management circuit 112 has various functions. The account management circuit 112 facilitates registration of the user 202 with the information computing system 102 via a registration function 206. The registration of the user 202 is described in further detail below with respect to FIG. 6. The account management circuit 112 includes a maintenance function 208 that allows the account management circuit 112 to perform various maintenance functions with respect to the information computing system 102, such as unregistering users, updating information computing system 102 software, and the like. The account management circuit 112 includes a database management function 210. The database management function 210 enables the account management circuit 112 to manage the user information database 118. The features of the database management function 210 may include, for example, removing data from the user information database 118, versioning data in the user information database 118, performing virus scans on the user information database 118, extracting data from documents stored in the user information database 118 (e.g., via OCR), validating data in the user information database 118, augmenting data in the user information database 118, notifying associated entities when data the user information database 118 has changed, mining data and content in the user information database 118 for information, data and content registration with a user account, data and content searching/querying, data and content retrieval, data and content updating, data and content deregistration, and the like. In arrangements where the information computing system 102 is part of the financial institution 120, the account management circuit 112 includes a financial institution integration function 212 that facilitates communication between the information computing system 102 and the financial institution computing system 122.

The account management circuit 112 also manages how users and third-parties access the data and documents stored in the user information database 118. Accordingly, the account management circuit 112 includes an authorization function 214 that allows the user 202 to set access permissions to the data and documents associated with the user 202 for other users and entities. The access permissions, for example, may be a one of data share for a specific document, permission for permanent access to a specific document or sets of documents, or pairing access such that the authorized users/entities can pull or push data associated with the user 202 for a set period of time (e.g., expires after a week) or until otherwise revoked by the user 202. The account management circuit 112 also includes a third-party access function 216 that facilitates third party access to the user's information and documents. For example, a third-party may be paired with the user account thereby allowing the third-party to repeatedly push documents (e.g., pay stubs) into the user information database 118 on behalf of the user 202.

Still referring to FIG. 2, during registration and/or population of the user's account, documents and information are provided to the information computing system 102 and are stored in the user information database 118 via the inbound information circuit 114. The data and document population may be facilitated by one of the APIs 204. The inbound information circuit 114 includes a put function 218 and a push function 220. The put function 218 and the push function 220 are two different ways that information and documents are provided into the user information database 118. The put function 218 allows the user 202 to use any of the access channels that provides for calls to register existing data and documents within the entity operating the information computing system 102 with the user information database 118. For example, the put function 218 allows the user 202 to register existing tax forms, driver's license copies, etc. that are already stored in the account holder databases 128 of the financial institution 120. The push function 220 allows the user 202 and entities (e.g., an employer, a government agency) with user permission to register data and documents with the user information database 118. The entities may be the financial institution 120 (e.g., that push yearly 1090 or 1099 tax forms that are created into the user information database 118 to be associated with the user 202) or other entities such as employers or government agencies (e.g., that push bi-weekly paystubs or other forms into the user information database 118 to be associated with the user 202).

During document and information sharing, documents and/or information from the user's account are retrieved from the user information database 118 via the outbound information circuit 116. Documents and data associated with the user 202 can be pulled or pushed from the user information database 118. Accordingly, the outbound information circuit 116 includes a pull function 222 and a push function 224. The pull function 222 allows the user 202 to identify data in the user information database 118 and select it for download or transmission to a device. The push function 224 allows the user 202 to setup regular pushes of data or documents to the user 202 or to an identified entity. The push function 224 may also include a notification feature that provides notifications to the user 202 and/or the entity receiving the data when data is pushed.

Figure 3:
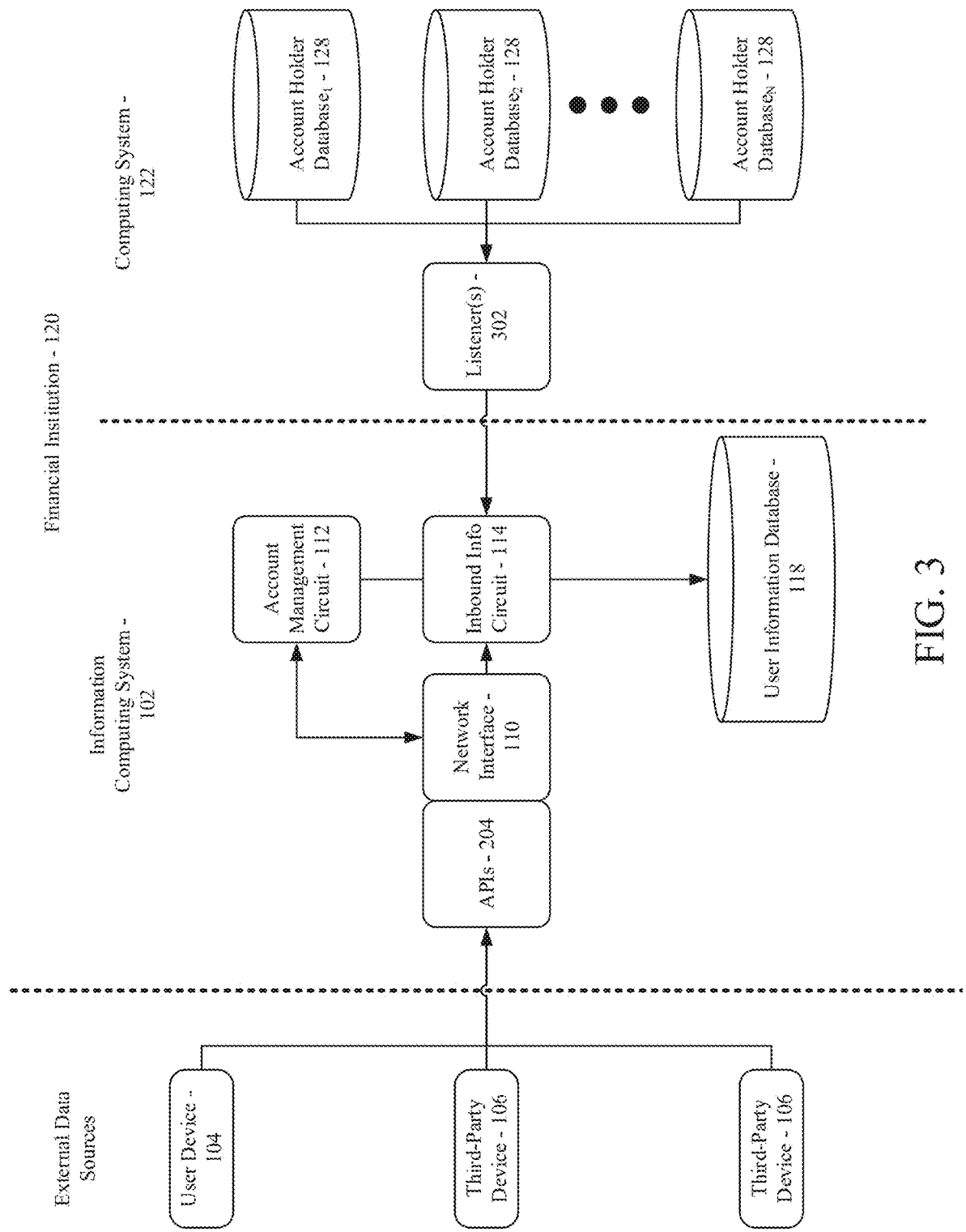
FIG. 3 is a diagram of the operation of the information computing system of FIG. 1 during a user registration or preregistration process.

Referring to FIG. 3, the operation of the information computing system 102 is shown during a user registration or preregistration process. In the arrangement of FIG. 3, the information computing system 102 is affiliated or operated by the financial institution 120. In preparation for registering a user (e.g., the user 202 of FIG. 2), the information computing system 102 can pull existing user information stored with the various account holder databases 128 through an e-discovery process (e.g., as described below with respect to FIG. 4). For example, if the user is an existing account holder with the financial institution 120, the user previously provided personal documents and information during the standard boarding process for the user, such as copies of a driver's license, a social security card, tax information, and the like. Accordingly, the information computing system 102 can obtain the information from the account holder databases 128 by scanning each of the account holder databases 128 to identify data (e.g., information, documents, metadata, content, content links, etc.) relevant to the user being registered either directly or indirectly through the financial institution computing system 122 via the internal network 130. Additionally, after initial registration of the user, the information computing system 102 can receive information newly provided to the financial institution computing system 122 (e.g., an updated copy of a driver's license during the opening of a new account with the financial institution 120) from a listener 302 associated with a respective account holder database 128. The listeners 302 provide notifications of new user information stored in the account holder databases 128.

Since the financial institution 120 offers multiple different types of products, with each product often requiring the same information, the listeners 302 may return duplicate data. For example, the user may have provided a driver's license to the financial institution 120 twice: once when opening a checking account and a second time when applying for a mortgage. Accordingly, upon receiving the data from the listeners 302, the information computing system 102 identifies duplicate data (e.g., via business rules programmed into the account management circuit 112 or the inbound information circuit 114) and identifies the "master copy" of the data and a "secondary copy" (or secondary copies) of the data. The master copy of the data may be the copy of the data that is at least one of the most recent version of the data or the highest quality file of the data (e.g., highest quality image of a driver's license). The master copy of the data is retained for further processing, while the secondary copy of the data may be discarded. The information computing system 120 selectively performs data augmentation on the received data by cross-referencing additional databases (e.g., third-party databases, credit unions, composite information systems, etc.) to add additional data and metadata to the received data. In some arrangements, the information computing system 120 performs data extraction (e.g., via OCR capabilities) to extract information (e.g., name, address, numbers, birth date, etc.) from documents (e.g., image files, PDFs, etc.) containing text and pictures. The received data is aggregated and stored in the user information database 118 via the inbound information circuit 114, where it is linked with the user. Accordingly, the user information database 118 forms a content federation layer that standardizes content from the various account holder databases 128 for the user.

During registration, external data sources may also be used to populate the user information database 118. For example, the user can supply documents and information directly to the information computing system 102 via the user device 104. Additionally, the user can arrange for third-parties to supply information and documents associated with the user directly to the information computing system 102 from third-party devices 106. For example, the user's employer may be configured to supply paystubs and tax information to the information computing system 102.

Figure 4:
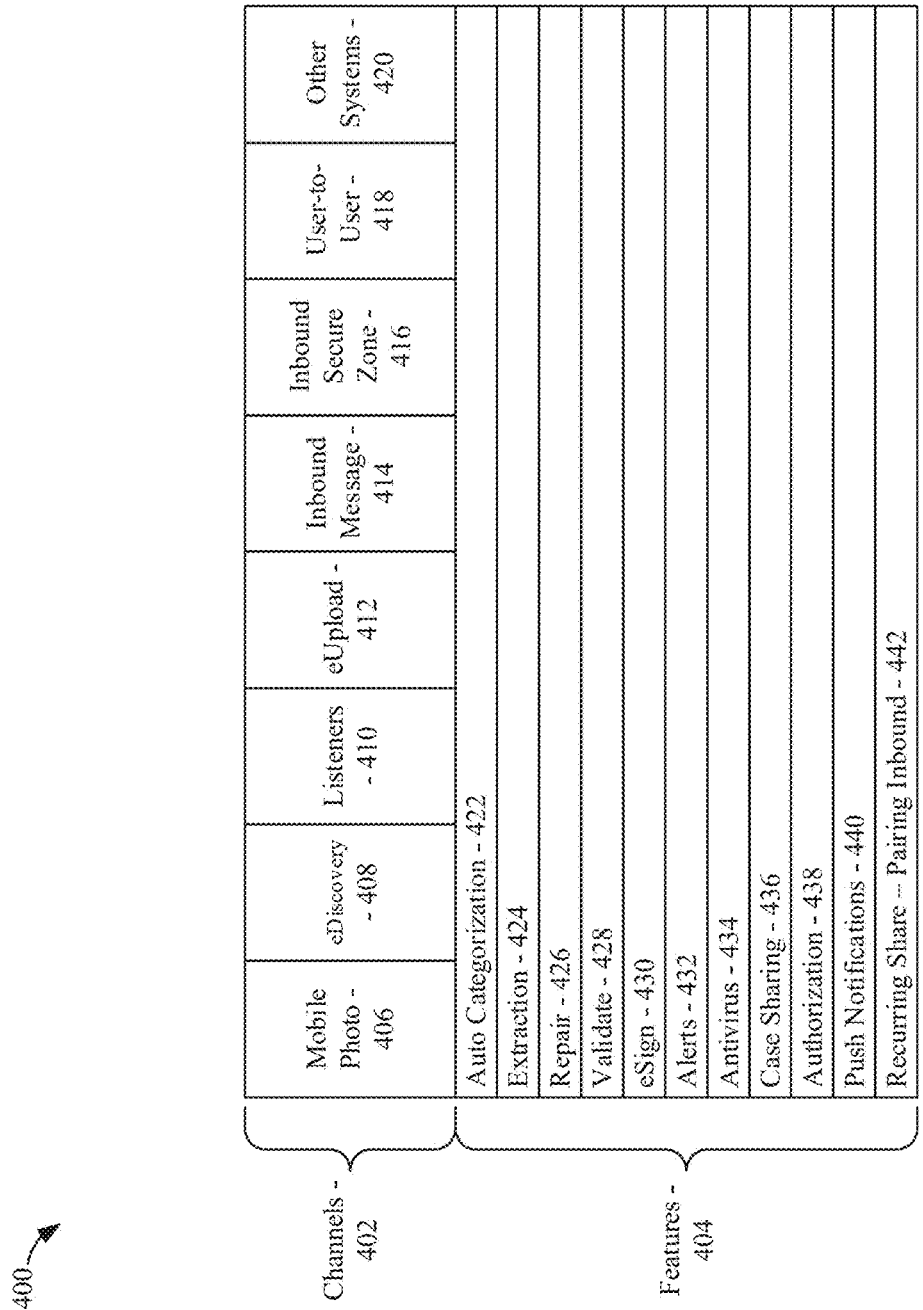
FIG. 4 is an overview of the different channels users can use to upload information to the information computing system of FIG. 1.

Users of the information computing system 102 can upload information (e.g., data and documents) via a variety of different channels. FIG. 4 shows an overview 400 of the different channels 402 users can use to upload information to the information computing system 102. The mobile photo channel 406 allows the user to take a picture of a document (e.g., via a camera of the user device 104) and upload the photo of the document to the information computing system 102. The eDiscovery channel 408 allows the user to initiate a mining of internal databases (e.g., the account holder databases 128) and/or external databases (e.g., third-party data storage systems, such as Dropbox®, Google® Drive, OneDrive®, etc.) for documents and data for upload to the information computing system 102. As described above with respect to FIG. 3, the user can upload information via the listeners channel 410, which uses the listeners 302 to identify new relevant information in the account holder databases 128 provided after initial registration (e.g., an upload of a new driver's license, an upload of a previously not stored document, etc.). The user can upload existing digital documents (e.g., MS Word files, PDFs, image files, etc.) via the eUpload channel 412 accessible through a user interface of the information system client 140. The user (or another person or entity) can send a message including the information (e.g., as text within the message or as an attachment) to an e-mail address, phone number, or fax number associated with the information computing system 102 via the inbound message channel 414. The user can upload information and files to the information computing system 102 via the inbound secure zone channel 416, which may include a website created by and hosted by the information computing system 102. The website, when accessed by the user, may require the user to provide login credentials (e.g., username and password, identity token, etc.) to gain access to the website, where the user can provide the information to the website for secure upload to the information computing system 102. In some arrangements, the inbound secure zone channel 416 can be shared with other individuals and entities such that the other individuals and entities can provide information for upload to the user's account with the information computing system 102. The user can receive documents and information from other users via the user-to-user channel 418. Through the user-to-user channel 418, a first user can send a message to a second user containing the information to be stored with the second user's account. The message may be an e-mail message, a text message, an internal message facilitated by the information computing system 102, or the like. Further, the user can import information from other systems (e.g., internal systems, such as the financial institution computing system 122, or external systems, such as credit bureaus, employers, government entities, etc.) through the other systems channel 420. The other systems channel 420 relies on the APIs 204 to facilitate communication between the other systems and the information computing system 102.

Each of the above-described channels 402 may be layered with any number of features 404. The features 404 automatically manipulate or modify incoming information. The auto categorization feature 422 allows the information computing system 102 to automatically recognize the uploaded information and categorize the information without the user's intervention. For example, the auto categorization 422 feature can automatically recognize uploaded images as corresponding to the user's driver's license, passport, W2, and the like. The extraction feature 426 uses optical character recognition (OCR) and other data extraction/recognition techniques (e.g., cross-referencing other databases based on received information to identify additional or tangential information related to the provided information). The extracted information from the received information may be saved as a separate file in the user information database 118 or as metadata associated with the provided information. The repair feature 426 allows the information computing system 102 to repair received information that may be damaged or incomplete (e.g., a corrupted data file). For example, a partial image or low resolution image of a user's driver's license may be sent to an employee of the financial institution 120 for manual review of the information contained in the image file. As another example, the information computing system 102 may return the file to the user for manual review of the provided information. The validate feature 428 allows the user or another party (e.g., an employee of the financial institution 120) to verify that the auto categorization and data extraction features functioned properly (e.g., that the information extracted from uploaded documents and that the determined category of the information are correct). The eSign feature 430 enables the information computing system 102 to send documents and information back to the user for verification and digital signature. If the user attaches a digital signature to the document or information, the digital signature serves as verification that the contents are accurate or that the user has signed a document. The alerts feature 432 allows the user to assign various alerts that are tagged to uploaded information or generally to the account. The alerts may include any of alerts that new content has been uploaded to the user's account, that previously uploaded content has changed, that previously uploaded content has been validated/repaired/categorized, that potential fraud has been detected with respect to the user's account, and/or that user information has been changed (e.g., contact information changed, address changed, name changed, etc.). The antivirus feature 434 allows the information computing system 102 to scan each uploaded data file for viruses and malware. The antivirus feature 434 removes any infected file before the file can reach the user information database 118. The push notification feature 440 informs a user of changes to the user's account (e.g., newly uploaded documents) when the user logs into the information system client 140.

The features 404 also include sharing and permissions features. The case sharing feature 436 allows the user or the information computing system 102 to open a "case" having a unique case number along with a description as to what the case is for. Other users and entities can access, change, or delete data stored within the case. For example, if the user passes away, an employee of the financial institution 120 can open a case having a unique number along with a description (e.g., estate documents for user). The employee can then provide access to the case to the executor of the estate to populate the case with any necessary files and to view any pertinent information relating to the now deceased user. Other example instances where a case may be opened include when the user applies for a line of credit (e.g., a case can be opened for the user and the creditor), when a will is being created (e.g., a case can be opened for the user and the executor, accountants, etc.), and the like. An example case sharing situation is described in further detail below with respect to FIG. 8. The authorization feature 438 allows the user to authorize other users and third-parties to access specific pieces of information stored in the user information database 118. The authorization may be a permanent authorization, a one-time authorization, or a time-limited authorization (e.g., authorization for a set period of time). The recurring share feature 442 (also referred to as inbound pairing) allows the user to configure the information computing system 102 to periodically pull content from an external database (e.g., from the user's Dropbox®) or to permit third-parties to periodically push content to the user's account (e.g., permitting an employer to periodically push pay stubs to the user information database 118).

Figure 5:
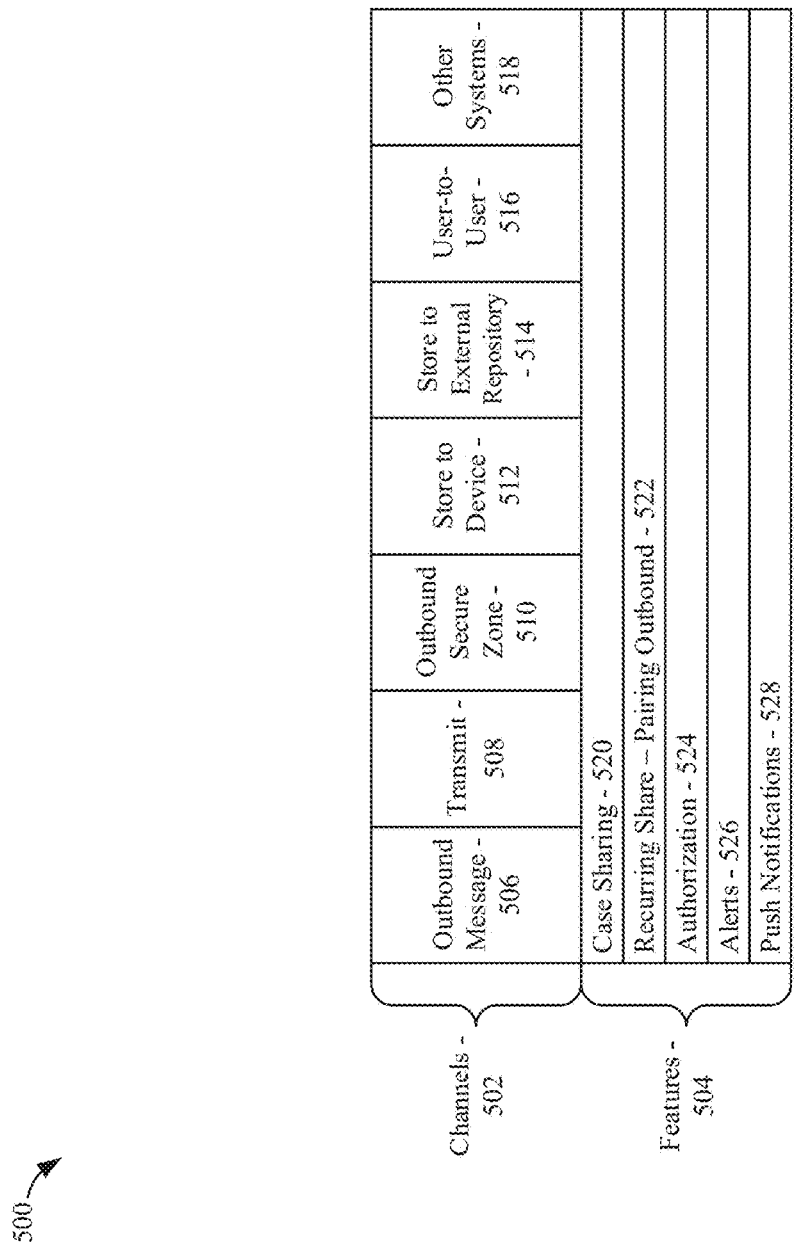
FIG. 5 is an overview of the different channels users can use to retrieve information from the information computing system of FIG. 1.

Similar to the upload, users of the information computing system 102 can retrieve information (e.g., data and documents) via a variety of different channels. FIG. 5 shows an overview 500 of the different channels 502 users can use to retrieve information from the information computing system 102. The outbound message channel 506 allows users to share content stored in the user information database 118 by sending a message (e.g., e-mail message, SMS/MMS message, in-app message) to the content recipient. The message may include a link to the content, embedded content, and/or an attached file of the content. The transmit channel 508 allows the user to transmit content to a recipient (e.g., via a secured document delivery, via an airdrop interface, via a Dropbox® interface, via a Google® Drive interface, etc.). The outbound secure zone channel 510 provides a secure zone within the information computing system 102 where the user can make content available to other users (e.g., an HTTPS link, an FTP link, etc.). To access the secure zone, the user may provide a password or a one-time passcode to the intended recipient. The store to device channel 512 allows the user to identify a file in the user information database 118 (e.g., via the information system client 140) and download the identified file (e.g., to the user device 104). The store to external repository channel 514 allows the user to identify a file in the user information database 118 (e.g., via the information system client 140) and to export the identified file to an external repository (e.g., Dropbox®, Google® Drive, etc.). The user-to-user channel 516 is the counterpart to the user-to-user channel 418 that permits import. Through the user-to-user channel 516, a first user can send a message to a second user containing the content stored with the first user's account. The message may be an e-mail message, a text message, an internal message facilitated by the information computing system 102, or the like. Further, the user can export information to other systems (e.g., internal systems, such as the financial institution computing system 122, or external systems, such as credit bureaus, employers, government entities, etc.) through the other systems channel 518. The other systems channel 518 relies on the APIs 204 to facilitate communication between the other systems and the information computing system 102.

Each of the above-described channels 502 may be layered with any number of features 504. The features 504 automatically manipulate or modify incoming information. The case sharing feature 520 operates in the same manner described above with respect to the case sharing feature 436. The recurring share feature 522 (also referred to as outbound pairing) allows the user to configure the information computing system 102 to allow a third-party to periodically pull content or the information computing system 102 to periodically push content from the user information database 118 associated with the user to a third-party. The authorization feature 524 allows the user to authorize other users and third-parties to access specific pieces of information stored in the user information database 118. The authorization may be a permanent authorization, a one-time authorization, or a time-limited authorization (e.g., authorization for a set period of time). The alerts feature 526 functions in the same manner as described above with respect to the alerts feature 432. The push notifications feature 528 functions in the same manner as described above with respect to the push notifications feature 440.

Figure 6:
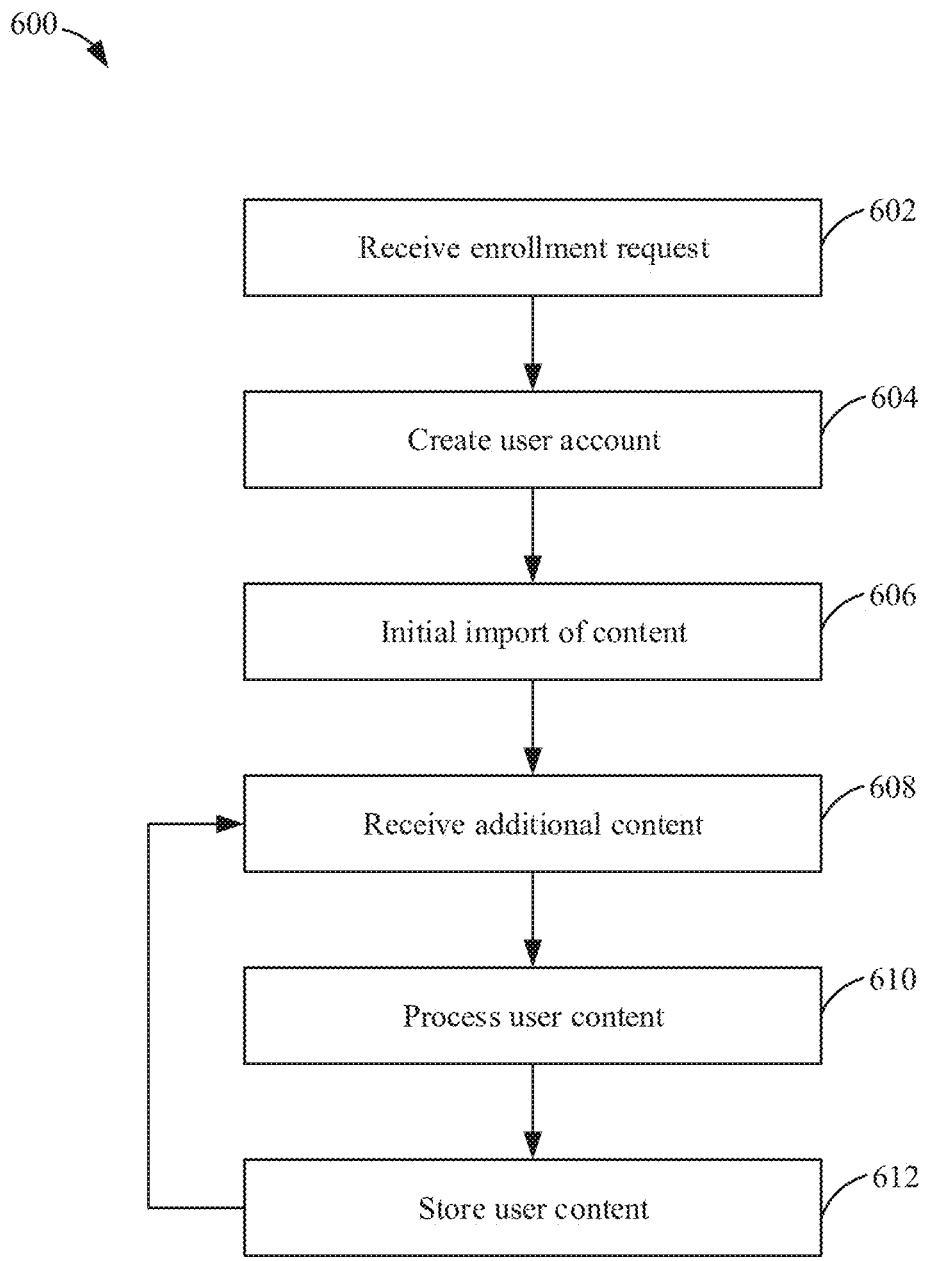
FIG. 6 is a flow diagram of a method of enrolling a user with the information storage and distribution system of FIG. 1 according to an example embodiment.

Referring to FIG. 6, a flow diagram of a method 600 of enrolling a user with the information storage and distribution system of the information computing system 102 and storing (i.e., registering) content with the information computing system 102 is shown according to an example embodiment. The method is performed by the information computing system 102 (e.g., by the account management circuit and the inbound information circuit 114). The method 600 begins when an enrollment request is received at 602. The information computing system 102 receives the enrollment request either directly from the user (e.g., from the user device 104) or indirectly from the user (e.g., from an employee of the financial institution 120 entering the user request into an employee device, such as a third-party device 106) via the account management circuit 112. The enrollment request includes basic information about the user (e.g., name, address, birthdate, e-mail address, etc.). In some arrangements, the request includes an identification of user accounts held with the financial institution 120 (e.g., a checking account, an online banking account username, etc.).

A user account is created at 604. The information computing system 102 creates the user account for the user. The user account includes a username and a password. In some arrangements, the user creates the username and/or the password. In other arrangements, the information computing system 102 automatically creates and assigns the username and/or the password. The username and password are stored in the user information database 118.

An initial import of content is performed at 606. Based on the information in the enrollment request, the information computing system 102 performs a pre-registration import of known user content if known user content is available. For example, the information computing system 102 pulls any available content associated with the user from the account holder databases 128 if the user is an existing customer of the financial institution as described above with respect to the e-Discovery channel 408 of FIG. 4. In arrangements where the user is not an existing customer of the financial institution, step 606 may be skipped.

Additional content is received at 608. The information computing system 102 receives the user content via the inbound information circuit 114. The received content may include, for example, any of the content described above with respect to FIGS. 1 through 5. The content may be received from a user device 104 associated with the user, from a user device 104 associated with another user of the information computing system 102, from a third-party providing the content from a third-party device 106 (e.g., an employer, a government agency, a financial institution, etc.). The content may be in the form of text entered by the user, image files, document files, and the like. In some arrangements, the additional content is received post initial registration from the listeners 302 as described above with respect to FIGS. 3 and 4.

The user content is processed at 610. The information computing system 102 processes the user content received at 606 and 608. The user content is processed according to any combination of the above-described features 404 of FIG. 4. After the user content is processed at 610, the user content is stored at 612. The information computing system 102 stores the content in the user information database 118. The content is associated with the user account within the user information database 118. Steps 608 through 612 are repeated for all incoming content (e.g., future uploads of content that occur after the user's account has been created).

Figure 7:
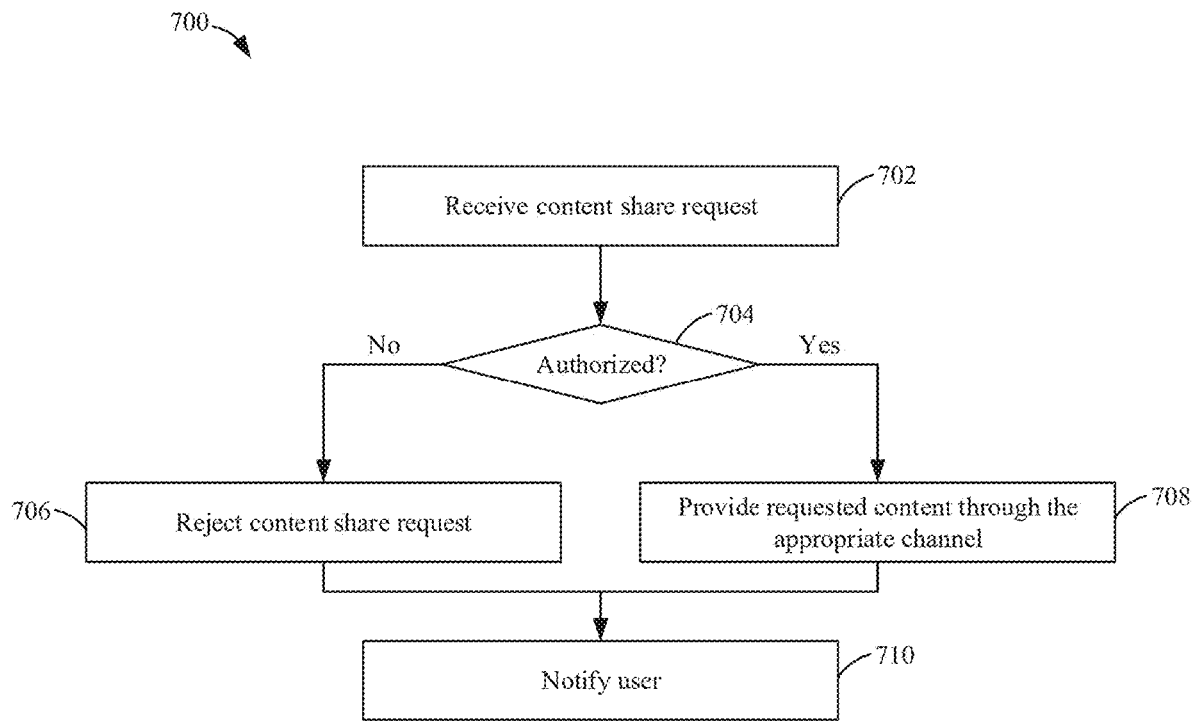
FIG. 7 is a flow diagram of a method of exporting or transmitting stored content from the information computing system of FIG. 1 according to an example embodiment.

Referring to FIG. 7, a flow diagram of a method 700 of exporting or transmitting stored content from the information computing system 102 is shown according to an example embodiment. The method is performed by the information computing system 102 (e.g., by the account management circuit and the outbound information circuit 116). The method 700 begins when a content share request is received at 702. The information computing system 102 receives the content share request from either the user associated with the content or another party or entity attempting to access the content. In some arrangements, the request identifies a specific piece of content associated with a user (e.g., a user's driver's license). In other arrangements, the request identifies a grouping of files (e.g., a request to access a folder).

The information computing system 102 determines if the request was received from a user or entity authorized to access the requested content at 704. In arrangements where the requestor is the user, 704 is skipped and the method 700 proceeds to 708. In all other arrangements, the information computing system 102 cross-references the request with authorized requests (e.g., as set by the user with respect to the sharing rules described above with respect to FIGS. 3 and 4). If the user or entity initiating the request is not authorized, the content share request is rejected at 706. The information computing system 102 sends a response message to the requestor indicating that the request has been denied. If the user or entity initiate the request is authorized, the requested content is provided through the appropriate channel at 708. The information computing system 102 provides the content through any of the channels 502 described above with respect to FIG. 5.

After 706 or 708, the user is notified of the request and the outcome of the request at 710. The information computing system 102 sends the notification to the user via the user device 104. The notification indicates the identity of the requestor, the content requested, and whether the content was shared (at 708) or not shared (at 706). The notification may be transmitted as an e-mail message, a text message, or an in-app message.

Figure 8:
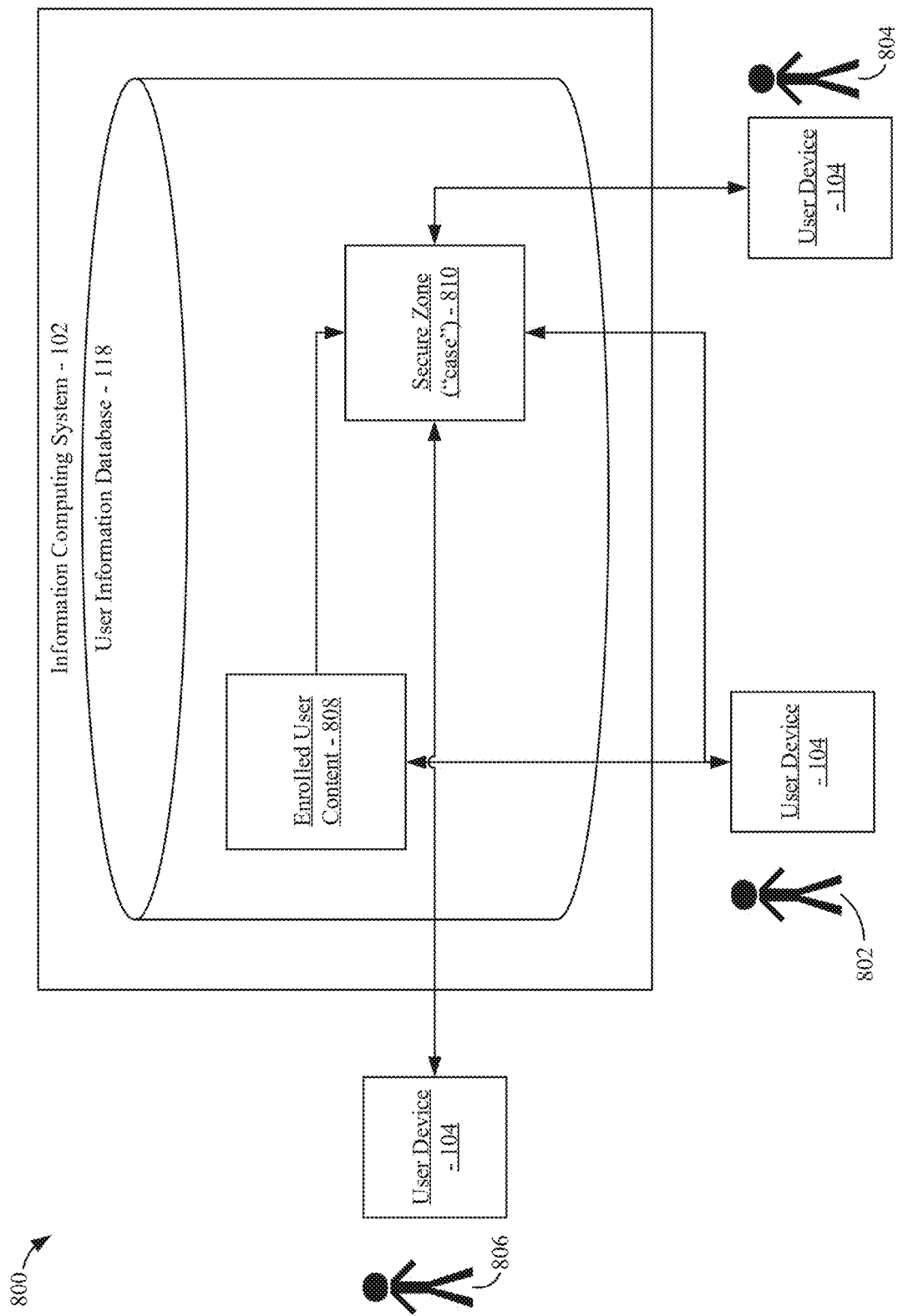
FIG. 8 is a schematic diagram of a case sharing scheme according to an example embodiment.

Referring to FIG. 8, a schematic diagram of a case sharing scheme 800 (e.g., as described above with respect to the case sharing feature 436 of FIG. 4) is shown according to an example embodiment. The case sharing scheme 800 is facilitated by the information computing system 102. In the case sharing scheme 800, three users are described: an enrolled user 802, a non-enrolled user 804, and a system employee 806. The enrolled user 802 has an account with the information computing system 102, and thus, has enrolled user content 808 stored in the user information database 118. Only the enrolled user 802 has authorization to populate the enrolled user content 808 and retrieve content from the enrolled user content 808. The non-enrolled user 804 does not have an account with the information computing system 102. The system employee 806 is an employee (e.g., a team member) of the entity operating the information computing system 102 (e.g., the financial institution 120). Each of the enrolled user 802, non-enrolled user 804, and system employee 806 accesses the information computing system 102 through a respective user device 104.

The user information database 118 includes a secure zone 810. The secure zone 810 may be referred to as a case. The secure zone 810 can be created by the enrolled user 802 or the system employee 806. The secure zone 810 allows for unenrolled users, such as user 804, to upload and retrieve certain content shared in the secure zone 810. The secure zone 810 is also associated with the enrolled user 802 and the system employee 806. The secure zone 810 may correspond to an event associated with the enrolled user 802, such as a mortgage application. In such an arrangement, the system employee 806 may be a mortgagor and the non-enrolled user 804 may be the employer of the enrolled user 802. Accordingly, the unenrolled user 804 may be granted permission by the enrolled user 802 to access the secure zone for the purpose of uploading employment records (e.g., paystubs, tax forms, etc.) that will be shared with the system employee 806. The enrolled user 802 can also upload content to the secure zone 810. The enrolled user 802 can upload content to the secure zone 810 directly from the user device 104 or by exporting (i.e., creating a copy of) the content from the enrolled user content 808.

The above-described systems and methods facilitate the secure storage and sharing of user content. The above-described systems and methods may be used in conjunction with or integrated with an information wallet system configured to receive information from a user and to configured to enable the user to communicate the information in a highly secure, convenient, efficient, time-saving, and cost-effective manner. Such a system is described in U.S. patent application Ser. No. 14/195,297, entitled "USER AND ENTITY AUTHENTICATION THROUGH AN INFORMATION STORAGE AND COMMUNICATION SYSTEM," filed on Mar. 3, 2014, by Al Hecht, which herein incorporated by reference in its entirety and for all purposes.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method for authorizing the sharing of content, the computer-implemented method comprising:

receiving, by one or more processing circuits, an enrollment request of a user;

importing, by the one or more processing circuits, user content of the user based on the availability of the user content of the user prior to enrollment of the user;

creating, by the one or more processing circuits, a user account for the user, wherein the user account comprises the user content of the user;

importing, by the one or more processing circuits via a listener channel, newly provided content from a user device associated with the user, wherein the importing includes extracting data from the newly provided content;

determining, by the one or more processing circuits, that the newly provided content is a duplicate copy of the user content of the user;

identifying, by the one or more processing circuits, a first of the duplicate copies as a master copy and a second of the duplicate copies as a secondary copy;

removing, by the one or more processing circuits, the secondary copy;

receiving, by the one or more processing circuits, a content share request from a third-party for a piece of at least one of the user content of the user or the newly provided content; and authorizing, by the one or more processing circuits, the third-party based on cross-referencing the content share request with a plurality of sharing rules set by the user, wherein the authorization comprises a limitation on the piece of at least one of the user content of the user or the newly provided content.

2. The computer-implemented method of claim 1, further comprising:

providing, by the one or more processing circuits, the piece of at least one of the user content of the user or the newly provided content, wherein the limitation on the piece of at least one of the user content of the user or the newly provided content is a time-limited limitation for a set period of time.

3. The computer-implemented method of claim 1, wherein the one or more processing circuits automatically assign a username and a password for the user account.

4. The computer-implemented method of claim 1, wherein the enrollment request is received from at least one of the user device of the user, an employee device of an employee of a financial institution, or the financial institution.

5. The computer-implemented method of claim 4, wherein importing the user content of the user is an initial import, and the initial import further comprises accessing and pulling additional content from an account holder database based on determining the user is an existing customer of the financial institution.

6. The computer-implemented method of claim 1, further comprising:

receiving, by the one or more processing circuits, additional content from at least one of a second user device associated with another user or from a third-party device associated with an employer of the user, wherein the additional content is at least one of an image file or document file, and wherein the additional content is received after importing, via the listener channel, the newly provided content.

7. The computer-implemented method of claim 1, wherein the content share request from the third-party further comprises a request for access to a grouping of files in a folder.

8. A system for authorizing the sharing of content, the system comprising:

at least one processing circuit configured to:
receive an enrollment request of a user;
import user content of the user based on the availability of the user content of the user prior to enrollment of the user;
create a user account for the user, wherein the user account comprises the user content of the user;
import, via a listener channel, newly provided content from a user device associated with the user, wherein the importing includes extracting data from the newly provided content;
determine that the newly provided content is a duplicate copy of the user content of the user;
identify a first of the duplicate copies as a master copy and a second of the duplicate copies as a secondary copy;
remove the secondary copy;
receive a content share request from a third-party for a piece of at least one of the user content of the user or the newly provided content; and
authorize the third-party based on cross-referencing the content share request with a plurality of sharing rules set by the user, wherein the authorization comprises a limitation on the piece of at least one of the user content of the user or the newly provided content.

9. The system of claim 8, the at least one processing circuit further configured to:

provide the piece of at least one of the user content of the user or the newly provided content, wherein the limitation on the piece of at least one of the user content of the user or the newly provided content is a time-limited limitation for a set period of time.

10. The system of claim 8, the at least one processing circuit further configured to automatically assign a username and password for the user account.

11. The system of claim 8, wherein the enrollment request is received from at least one of the user device of the user, an employee device of an employee of a financial institution, or the financial institution.

12. The system of claim 11, wherein importing the user content of the user is an initial import, and the initial import further comprises accessing and pulling additional content from an account holder database based on determining the user is an existing customer of the financial institution.

13. The system of claim 8, the at least one processing circuit further configured to:

receive additional content from at least one of a second user device associated with another user or from a third-party device associated with an employer of the user, wherein the additional content is at least one of an image file or document file, and wherein the additional content is received after importing, via the listener channel, the newly provided content.

14. The system of claim 8, wherein the content share request from the third-party further comprises a request for access to a grouping of files in a folder.

15. A non-transitory computer readable media having computer-executable instructions embodied therein that, when executed by one or more processing circuits, causes the one or more processing circuits to:

receive an enrollment request of a user;
import user content of the user based on the availability of the user content of the user prior to enrollment of the user;
create a user account for the user, wherein the user account comprises the user content of the user;
import, via a listener channel, newly provided content from a user device associated with the user, wherein the importing includes extracting data from the newly provided content;
determine that the newly provided content is a duplicate copy of the user content of the user;
identify a first of the duplicate copies as a master copy and a second of the duplicate copies as a secondary copy;
remove the secondary copy;
receive a content share request from a third-party for a piece of at least one of the user content of the user or the newly provided content; and
authorize the third-party based on cross-referencing the content share request with a plurality of sharing rules set by the user, wherein the authorization comprises a limitation on the piece of at least one of the user content of the user or the newly provided content.

16. The non-transitory computer readable media of claim 15, the computer-executable instructions, when executed by the one or more processing circuits, further causes the one or more processing circuits to:

provide the piece of at least one of the user content of the user or the newly provided content, wherein the limitation on the piece of at least one of the user content of the user or the newly provided content is a time-limited limitation for a set period of time.

17. The non-transitory computer readable media of claim 15, the computer-executable instructions, when executed by the one or more processing circuits, further causes the one or more processing circuits to automatically assign a username and password for the user account.

18. The non-transitory computer readable media of claim 15, wherein the enrollment request is received from at least one of the user device of the user, an employee device of an employee of a financial institution, or the financial institution.

19. The non-transitory computer readable media of claim 18, wherein importing the user content of the user is an initial import, and the initial import further comprises accessing and pulling additional content from an account holder database based on determining the user is an existing customer of the financial institution.

20. The non-transitory computer readable media of claim 15, the computer-executable instructions, when executed by the one or more processing circuits, further causes the one or more processing circuits to:

receive additional content from at least one of a second user device associated with another user or from a third-party device associated with an employer of the user, wherein the additional content is at least one of an image file or document file, and wherein the additional content is received after importing, via the listener channel, the newly provided content.

* * * * *